United States Patent
Ran et al.

(10) Patent No.: US 10,326,952 B2
(45) Date of Patent: Jun. 18, 2019

(54) DIGITAL IMAGING WITH MASKED PIXELS

(71) Applicant: Bio-Rad Laboratories, Inc., Hercules, CA (US)

(72) Inventors: Boaz Ran, Haifa (IL); Steve Swihart, Walnut Creek, CA (US); Evan Thrush, San Anselmo, CA (US); Itay Barak, Kibuts Yasur (IL)

(73) Assignee: Bio-Rad Laboratories, Inc., Hercules, CA (US)

( * ) Notice: Subject to any disclaimer, the term of this patent is extended or adjusted under 35 U.S.C. 154(b) by 0 days.

(21) Appl. No.: 15/675,494

(22) Filed: Aug. 11, 2017

(65) Prior Publication Data

US 2017/0366768 A1  Dec. 21, 2017

Related U.S. Application Data

(62) Division of application No. 14/563,411, filed on Dec. 8, 2014, now Pat. No. 9,774,804.

(60) Provisional application No. 62/037,528, filed on Aug. 14, 2014, provisional application No. 61/915,930, filed on Dec. 13, 2013.

(51) Int. Cl.
*H04N 5/365* (2011.01)
*H04N 5/361* (2011.01)

(52) U.S. Cl.
CPC .............. *H04N 5/361* (2013.01); *H04N 5/365* (2013.01)

(58) Field of Classification Search
CPC ................................ H04N 5/361; H04N 5/365
See application file for complete search history.

(56) References Cited

U.S. PATENT DOCUMENTS

| | | | | |
|---|---|---|---|---|
| 6,487,351 B1 * | 11/2002 | Cryan | ................... | C03B 37/028 |
| | | | | 385/120 |
| 7,163,882 B1 | 1/2007 | Yazawa et al. | | |
| 7,636,115 B2 * | 12/2009 | Hong | ....................... | G06T 5/50 |
| | | | | 257/232 |
| 7,663,670 B1 | 2/2010 | Orboubadian | | |

(Continued)

FOREIGN PATENT DOCUMENTS

| | | |
|---|---|---|
| CN | 103022065 A | 4/2013 |
| DE | 10146902 A1 | 9/2002 |

(Continued)

OTHER PUBLICATIONS

Bosco, A. et al., "A Temporal Noise Reduction Filter Based on Image Sensor Full-Frame Data", Consumer Electronics, 2003. ICCE. 2003 IEEE International Conference on Consumer Electronics (Jun. 17-19, 2003), pp. 402-403.

(Continued)

*Primary Examiner* — Mekonnen D Dagnew
(74) *Attorney, Agent, or Firm* — Kilpatrick Townsend and Stockton LLP

(57) ABSTRACT

In one application, an imaging device includes an image sensor having an array of pixels, and a mask coupled with the image sensor. The mask is configured to darken a plurality of isolated pixels or groups of pixels interspersed within the array of pixels. The imaging device also includes a processor coupled with the image sensor and configured to receive image data from the image sensor, and determine a dark current fixed pattern noise based on the image data received from the plurality of darkened pixels or groups of pixels.

7 Claims, 11 Drawing Sheets

(56) References Cited

U.S. PATENT DOCUMENTS

| | | | |
|---|---|---|---|
| 8,310,577 | B1 | 11/2012 | Neter |
| 9,191,560 | B2* | 11/2015 | Suzuki .................. H04N 5/361 |
| 2002/0050518 | A1 | 5/2002 | Roustaei |
| 2003/0157581 | A1 | 8/2003 | Grill |
| 2003/0219891 | A1 | 11/2003 | Yazawa |
| 2004/0219602 | A1 | 11/2004 | Carlson et al. |
| 2005/0057655 | A1* | 3/2005 | Duesman .......... H01L 21/76805 348/187 |
| 2005/0266603 | A1 | 12/2005 | Findlater et al. |
| 2006/0082675 | A1* | 4/2006 | McGarvey ........... H04N 3/1568 348/362 |
| 2008/0007645 | A1 | 1/2008 | McCutchen |
| 2008/0291290 | A1 | 11/2008 | Sonoda et al. |
| 2009/0015831 | A1 | 1/2009 | Yguerabide et al. |
| 2011/0090332 | A1 | 4/2011 | Hing |
| 2011/0157433 | A1 | 6/2011 | Gerstenberger et al. |
| 2011/0204209 | A1 | 8/2011 | Barrows |
| 2012/0154653 | A1 | 6/2012 | Compton et al. |
| 2012/0242804 | A1 | 9/2012 | Ogasahara |
| 2012/0248560 | A1* | 10/2012 | Lee .................. H01L 27/14627 257/432 |
| 2013/0076951 | A1 | 3/2013 | Endo |
| 2015/0172526 | A1 | 6/2015 | Swihart et al. |

FOREIGN PATENT DOCUMENTS

| | | |
|---|---|---|
| EP | 2226762 A1 | 9/2010 |
| WO | 98/46007 A1 | 10/1998 |
| WO | 2008/027840 A1 | 3/2008 |
| WO | 2008/103865 A2 | 8/2008 |
| WO | 2013/138646 A1 | 9/2013 |
| WO | 2015/089031 A1 | 6/2015 |

OTHER PUBLICATIONS

Esposito, M. et al., "CMOS APS in pre-clinical science: next generation disruptive technology for multi-modality imaging", presented IEEE Nuclear Science Symposium and Medical Imaging Conference, Anaheim, CA, (Nov. 2012), 4 pages.

Esposito, M. et al., "Using a large area CMOS APS for direct chemiluminescence detection in Western Blotting Electrophoresis", presented SPIE Medical Imaging Conference, San Diego, CA, (Feb. 2012), 8 pages.

"Innovation Flyer" for Image Sensor Design & Innovation, DynAMITe-Wor;d's Largest Radiation-hard CMOS Imager, downloaded from URL:http://www.isdicmos.com/downloads/isdi_flyer.pdf, 2 pages.

Rudolph, M. et al., "Time Course for MuiGLO® HRP Chemiluminescent Substrates on Nitrocellulose Membrane", KPL, Inc. (2013), 4 pages.

Search Report, dated Apr. 15, 2015, for International Patent Application PCT/US2014/069359, 4 pages.

Written opinion, dated Apr. 15, 2015, for International Patent Application PCT/US2014/069359, 7 pages.

Search Report, dated Mar. 10, 2015, for International Patent Application PCT/US2014/069281, 1 page.

Written Opinion, dated Mar. 10, 2015, for International Patent Application PCT/US2014/069281, 5 pages.

Radspinner, David. A. et al.; "The revolutionary impact of today's array detector technology on chemical analysis"; International Conference on Scientific Optical Imaging (1990); SPIE vol. 1439; pp. 2-14.

Extended European Search Report dated Nov. 18, 2016 in EP Patent Application No. 14869916.8. 10 pages.

Supplementary European Search Report dated Nov. 2, 2016 in EP 14869552, 7 pages.

First Chinese Office Action in Chinese Application 2014800309899; dated Mar. 15, 2018; 21 pages.

\* cited by examiner

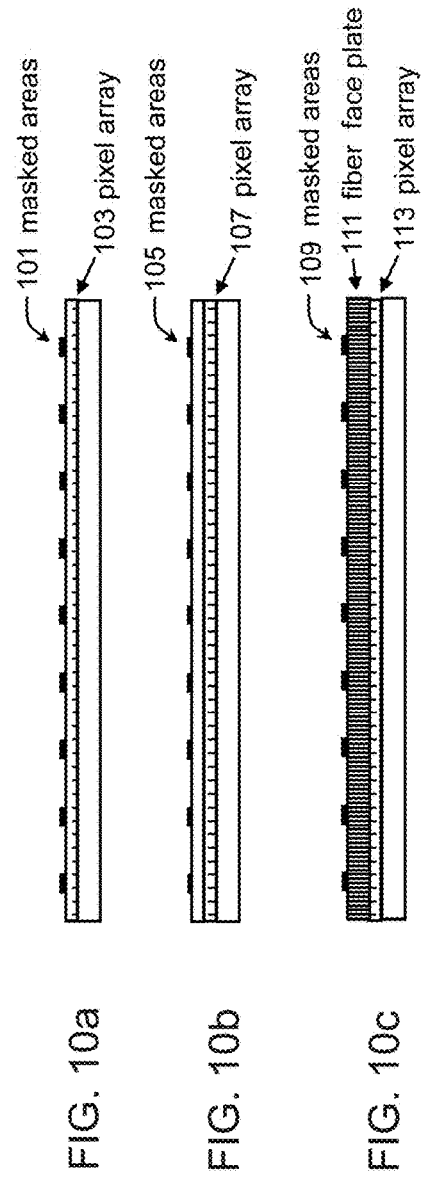
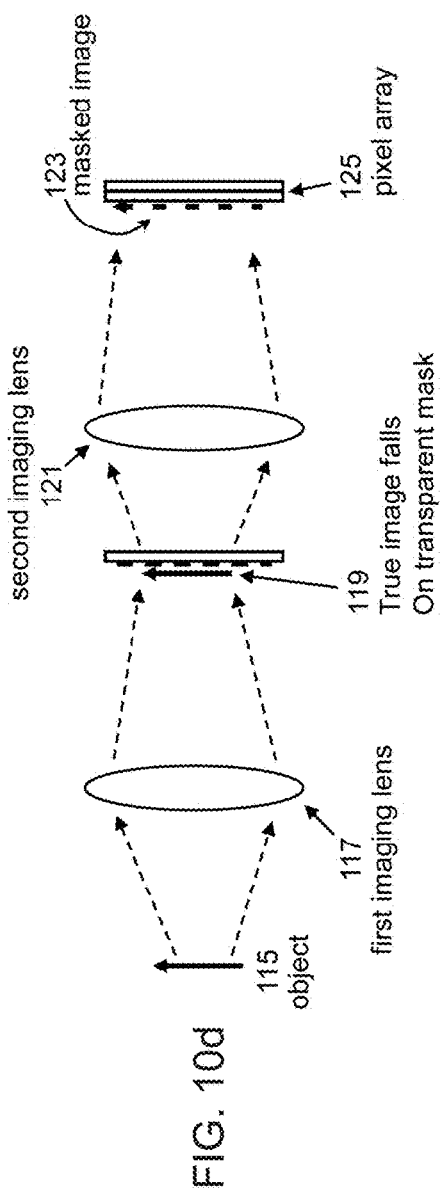
FIG. 10a
FIG. 10b
FIG. 10c
FIG. 10d

DIGITAL IMAGING WITH MASKED PIXELS

CROSS-REFERENCES TO RELATED APPLICATIONS

This application is a divisional of U.S. patent application Ser. No. 14/563,411 filed Dec. 8, 2014, which is a nonprovisional of and claims the benefit of priority of U.S. Provisional Application No. 62/037,528, titled, "Digital Imaging With Masked Pixels," filed on Aug. 14, 2014; and claims the priority of U.S. Provisional Application 61/915,930, titled "Non-Destructive Read Operations With Dynamically Growing Images," filed on Dec. 13, 2013, which disclosures are hereby incorporated by reference herein in their entireties for all purposes.

BACKGROUND OF THE INVENTION

Dark current is the relatively small electric current that flows though photosensitive devices even when no photons are entering the device. Dark current is one of the main sources for noise in image sensors. Dark current fixed pattern noise can be determined and recorded in advance for each individual sensor and then subtracted out during actual use of the sensor to reduce the dark current fixed pattern noise in an image. Since dark current fixed pattern noise is dependent on temperature, however, a previously recorded dark current fixed pattern noise may not be very accurate since the temperature of the sensor can vary during actual use. The sensor may be cooled to reduce the dark current fixed pattern noise, but it is not always possible or practical to include a cooling system in a device utilizing a sensor.

Embodiments of the invention address these and other issues individually and collectively.

BRIEF SUMMARY OF THE INVENTION

Embodiments of the invention provide for systems, devices, and processes for reducing dark current noise.

One embodiment of the invention is directed to an imaging device comprising an image sensor comprising an array of pixels, and a mask coupled with the image sensor, the mask configured to darken at least one pixel in the array of pixels.

Another embodiment of the invention is directed to a method comprising receiving, at a processor of a device, image data from an image sensor, determining a dark current fixed pattern noise based on data for a plurality of darkened pixels in the image data, and subtracting the dark current fixed pattern noise from the image data.

Another embodiment of the invention is directed to a non-transitory computer readable medium comprising computer-executable code for performing the method of receiving, at a processor of a device, image data from an image sensor, determining a dark current fixed pattern noise based on data for a plurality of darkened pixels in the image data, and subtracting the dark current fixed pattern noise from the image data.

Another embodiment of the invention is directed to a mask configured to be coupled with an image sensor wherein the image sensor comprises an array of pixels, the mask further configured to darken at least one pixel in the array of pixels.

These and other embodiments of the invention are described in further detail below.

BRIEF DESCRIPTION OF THE DRAWINGS

FIGS. 10A-10D show exemplary techniques for darkening pixels.

DETAILED DESCRIPTION OF THE INVENTION

Embodiments of the invention provide techniques for reducing dark current fixed pattern noise. Embodiments of the invention provide for a more accurate calculation of dark current fixed pattern that can then be subtracted from an image to reduce the dark current fixed pattern noise in the image. Darkened pixels throughout a pixel array of a sensor are used to determine the difference between a previously recorded dark current fixed pattern and a real-time dark current fixed pattern for each darkened pixel. An interpolation is then performed between darkened pixels nearest to each un-darkened pixel in the pixel array to determine the change for the un-darkened pixel. The change for the un-darkened pixel is then used to determine the dark current fixed pattern for the un-darkened pixel. The dark current fixed pattern for that un-darkened pixel is then subtracted from the signal received for that un-darkened pixel to correct for the dark current fixed pattern noise in the image. This may be performed pixel by pixel for each frame and may be performed real time, or near real time, during capture of an image.

Figure 1:
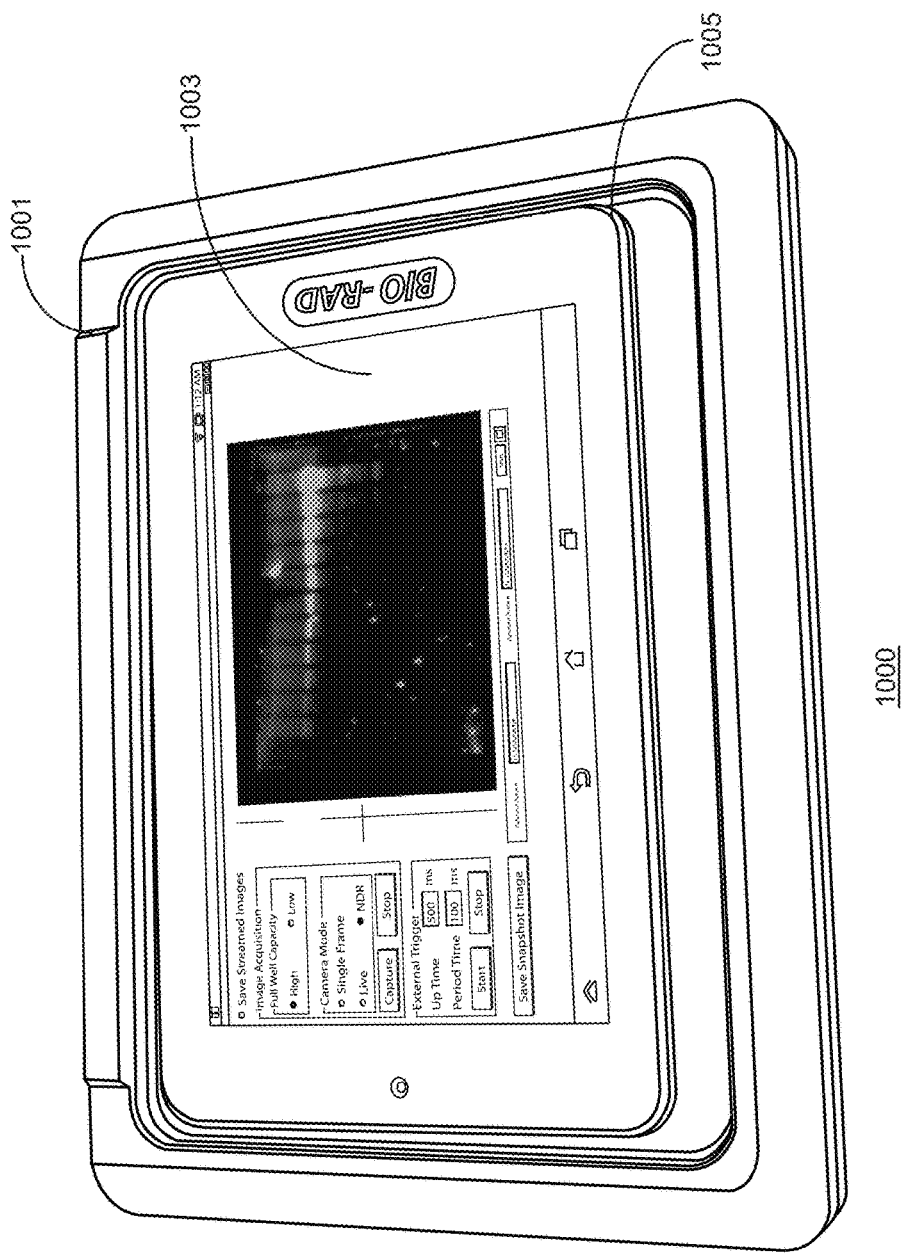
FIG. 1 shows an exemplary device that can be used in embodiments of the invention.

FIG. 1 shows an exemplary device 1000 that can be used in embodiments of the invention. The device 1000 may be an imaging device. It is understood that this is an exemplary device and that many other devices may be used with embodiments of the invention (e.g., cameras, x-ray machines, etc.). The device 1000 may be used to capture images of light emitted from specimens placed on the device. For example, the device 1000 may comprise a body 1001, a display 1003, and a lid 1005 that rests over a surface area such as a faceplate (e.g., a fiber faceplate) for placing one or more specimens on the device 1000. The faceplate may protect the sensor from a sample or specimen placed on the faceplate. A user may lift the lid 1005, place the specimen on the faceplate of the device 1000, and close the lid 1005. The device 1000 may begin to capture images automatically or in response to an indication from the user, such as pushing a button on the display 1003.

In some embodiments, the specimen is a biological sample, e.g., a protein or nucleic acid (e.g., DNA, RNA, or both) sample. The sample can be bound to a blotting membrane and images of the blotting membranes comprising labeled probes can be determined. Blotting techniques are commonly used in biochemical analyses. For example, mixed samples of biological entities are directly applied to a membrane (e.g., "dot blotting") or applied to electrophoretic gels and the components are separated by application of an electric field across the gel and then applied to a membrane (e.g., Southern, northern, or western blotting). The resulting pattern of migration of the substances contained in the sample is then detected in some manner. Biochemical targets (e.g., a target nucleic acid or protein) are then detected by a probe that binds to the target(s). Exemplary probes include antibodies, other non-antibody proteins, or nucleic acids. In some cases (e.g., when the probe is not directly labeled), the membrane is then treated and incubated with a secondary enzyme-, radioisotope-, fluorfluor-, or biotin- or other label-conjugated antibody specific for the primary probe.

Optionally, a detector reagent, e.g., a chromogenic, chemiluminescent, fluorescent, radiological, or streptavidin-labeled material, is applied which either binds to, or is a substrate of an enzyme linked to the probe, thereby generating a signal. It will be appreciated that there is a wide variety of ways signal from the probe is ultimately generated. Basic texts disclosing the general methods of various blotting techniques include Sambrook and Russell, Molecular Cloning, A Laboratory Manual (3rd ed. 2001); Kriegler, Gene Transfer and Expression: A Laboratory Manual (1990); and Current Protocols in Molecular Biology (Ausubel et al., eds., 1994-1999).

The device 1000 may further comprise an internal power supply and input and output jacks for various components (e.g., a printer, an external computer, an external display, external power supply, etc.). The input and output jacks may be wired or wireless according to known techniques and devices.

The device 1000 may further comprise a sensor (e.g., an image sensor). There are various types of sensors that may be utilized in embodiments of the invention. Some examples of sensor technology include charge coupled device (CCD) or complementary metal oxide semiconductor (CMOS) sensors. The sensor may be directly coupled with the faceplate on the device or may be coupled with an imaging system and the imaging system may be coupled with the faceplate. The sensor may comprise an array of pixels. The terms "array of pixels," "sensor array," and "pixel array" are used interchangeably throughout this application. In embodiments of the invention the array of pixels may be a two-dimensional array or a linear or one-dimensional array.

The device 1000 may further comprise a mask coupled with the sensor. The mask may be configured to darken at least one pixel in the array of pixels. For example, the mask may be configured to darken a plurality (e.g., 2, 3, 4, 5, or more) of pixels in the array of pixels. For example, from every 5 pixels to every 100 pixels may be darkened in each direction independently. As another example a percentage of the number of pixels may be darkened. For instance, 0.1% to 50% of the pixels may be darkened depending on the application and size of the array of pixels. And so if a sensor contains about one million pixels (for example), 0.1% or 1000 pixels may be darkened (as an example).

Accordingly the array of pixels may comprise a plurality of darkened pixels and a plurality of un-darkened pixels. The un-darkened pixels are those that have not been intentionally darkened (e.g., by an opaque material or other methods). The terms un-darkened, uncovered, not darkened, are used interchangeably throughout this application. There are many ways to distribute the darkened pixels over the sensor array. Some examples are shown in FIGS. 6-9 and explained below. In embodiments of the invention the mask may be configured to darken a plurality of non-adjacent pixels in the array of pixels or configured to darken a plurality (e.g., four pixels, six pixels) of adjacent pixels (e.g., a group of more than one adjacent pixel in the array of pixels).

The device may further comprise a processor coupled with the sensor. The processor of the device may be configured to perform various processes associated with the device. For example, the processor may be configured to receive image data from an image sensor, determine a dark current fixed pattern noise based on data for a plurality of darkened pixels in the image data, and subtract the dark current fixed pattern noise from the image data. The processor may be further configured to receive image data from the image sensor, determine a dark current fixed pattern noise based on a plurality of darkened pixels in the image data, and subtract the dark current fixed pattern noise from the image data. The processor may be further configured to receive image data from the image sensor, determine a dark current fixed pattern for each of a plurality of darkened pixels, and determine a dark current fixed pattern for each of a plurality of un-darkened pixels based on dark current fixed pattern of each of the plurality of darkened pixels. The processor may be further configured to subtract the dark current fixed pattern of each of the plurality of un-darkened pixels from the image data. The processor may be further configured to receive from the sensor a signal for each pixel in the array of pixels, the array of pixels comprising a plurality of darkened pixels and a plurality of un-darkened pixels, for each of the plurality of un-darkened pixels in the array of pixels, determine nearby darkened pixels that are nearest to each of the plurality of un-darkened pixels, determine a change in a dark current fixed pattern of each of the nearby darkened pixels from a previously recorded dark current fixed pattern of each of the nearby darkened pixels, determine a change in a dark current fixed pattern for each of the plurality of un-darkened pixels from a previously recorded dark current fixed pattern of each of the plurality of un-darkened pixels, based on an interpolation of the change in the dark current fixed pattern of each of the nearby darkened pixels that are nearest to each of the plurality of un-darkened pixels, determine a dark current fixed pattern of each of the plurality of un-darkened pixels based on the change in a dark current fixed pattern for each of the plurality of un-darkened pixels, and subtract the dark current fixed pattern of each of the plurality of un-darkened pixels from the signal for each of the plurality of un-darkened pixels.

Each sensor may have a unique dark current fixed pattern. Dark current fixed pattern can be measured and recorded in advance for a particular sensor. For example, a manufacturer of the sensor may take a series of frames when the sensor array is completely darkened to determine the dark current fixed pattern for that particular sensor. In the alternative a user of the sensor can do this before taking images with the sensor. This recorded dark current fixed pattern can then be subtracted from a single frame to reduce the dark current fixed pattern noise in an image. This previously recorded dark current fixed pattern may be stored on the device in which the sensor is used or utilized in a device or computer apparatus coupled with the sensor or device in which the sensor is used.

Figure 2:
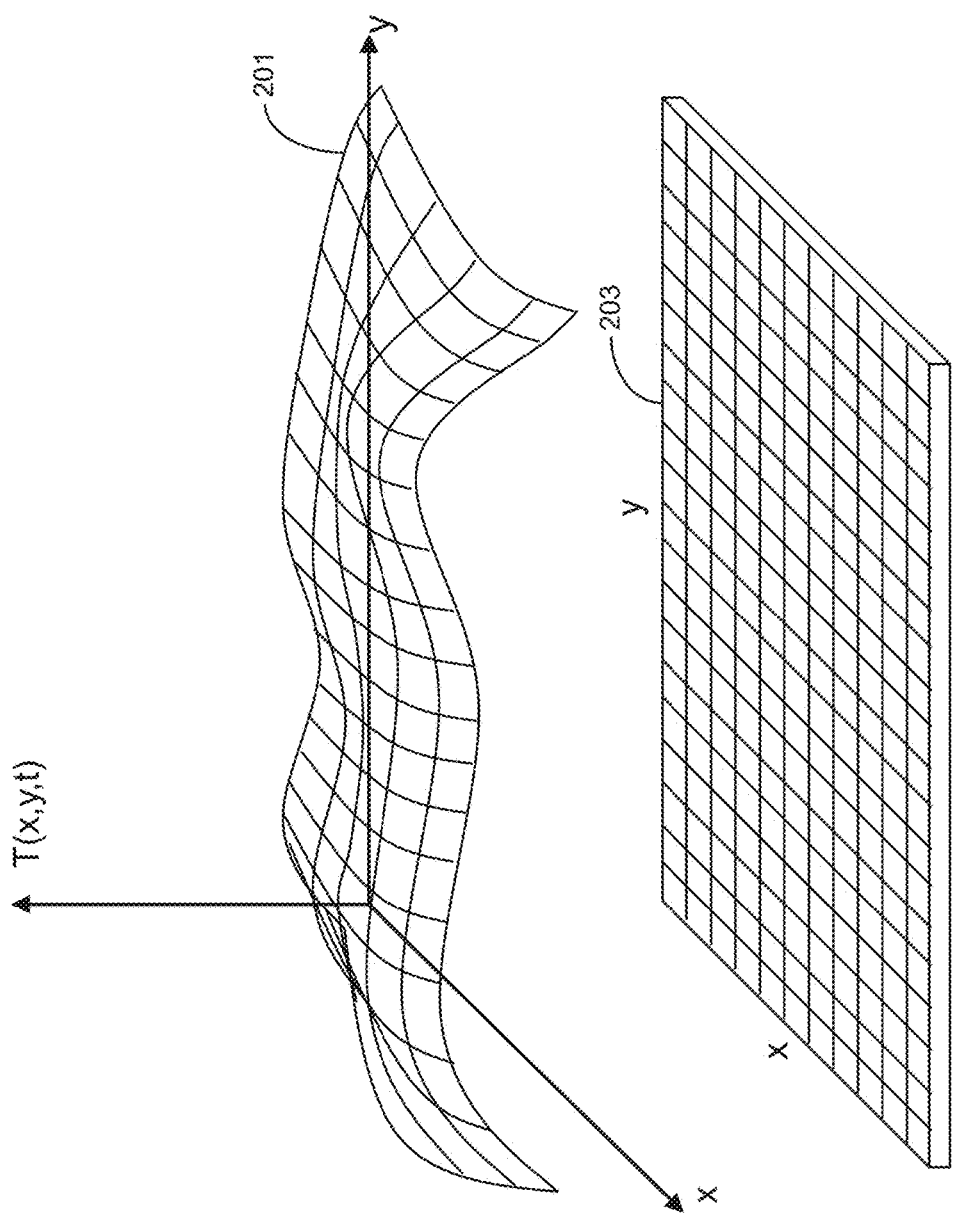
FIG. 2 shows an example of temperature variation over a pixel array of a sensor according to embodiments of the invention.

Embodiments of the invention provide a technique for reducing dark current fixed pattern noise by measuring the dark current fixed pattern noise at some specific darkened pixels over the sensor during frame capture. By doing so, the subtracted dark current fixed pattern is much closer to the true one in comparison to techniques where the dark current fixed pattern was recorded in advance and then subtracted. One reason this is a more accurate calculation of the true dark current fixed pattern noise is because the dark current fixed pattern has a very strong dependency on the temperature of the sensor. For example, dark current fixed pattern noise has a very strong dependency on the local temperature over the sensor and can vary differently from frame to frame and pixel to pixel, according to temporal and spatial variations in the temperature. Recording the fixed pattern noise in advance may not account for these temperature variations because the fixed pattern noise recorded in advance is typically done in a controlled environment where temperature is constant. FIG. 2 shows an example of temperature variation 201 over a pixel array sensor 203 at time t. The temperature over the sensor array is $T(x,y,t)$. At a different time t' the temperature dependence on x,y may be different. Moreover, the larger a sensor, the more temperature variation may occur over the sensor. Likewise with a larger pixel size or longer exposure time.

The temperature of over the sensor array is a function of spatial coordinates x,y and time t. This is because the sensor itself generates heat, the electronics that surround the sensor generate heat and other sources near the sensor generate and sink heat. All of these sources may generate and sink heat at different rates in different locations and different times. The local temperature and the local temperature's temporal nature causes the response and signal between pixel to pixel to be different and this difference may vary with time. A specific pixel can respond differently in different times for the same light conditions because of temperature change of this pixel (regardless of other random noises such as read noise and shot noise).

Some abbreviations are used to describe embodiments of the invention. These include the following:

| Abbreviation | Description |
| --- | --- |
| x, y | spatial coordinates of a pixel over the sensor |
| t | Time |
| t' | different time instance than t |
| te | exposure time |
| $T(x, y, t)$ | local temperature at a specific pixel x, y at time t |
| $M = M(x, y, te, T(x, y, t))$ | measured intensity at a specific pixel x, y with exposure time te, with local temperature $T(x, y, t)$ |
| $MD = MD(x, y, te, T(x, y, t))$ | measured intensity at a specific darkened pixel, x, y with exposure time te and temperature $T(x, y, t)$ |
| $I = I(x, y)$ | light intensity that falls on a specific pixel x, y (true one, not measured one) |
| $Rn = Rn(x, y, te, T(x, y, t))$ | Sensor read noise at a specific pixel x, y for a specific exposure time te and temperature $T(x, y, t)$. It has very low dependence on exposure time and temperature, therefore can be considered as $Rn = Rn(x, y)$ |
| $Sn = Sn(x, y, te, T(x, y, t), I(x, y))$ | Shot noise at a specific pixel x, y for a specific exposure time te, temperature $T(x, y, t)$ and light intensity $I(x, y)$) |
| $Df0 = Df0(x, y, t = 0, T(x, y, t))$ | measured intensity at a specific pixel x, y with exposure time closest to 0 seconds and temperature $T(x, y, t)$ under dark conditions |
| $Dn = Dn(x, y, te, T(x, y, t, T(x, y, t)))$ | Dark current noise at a specific pixel x, y for a specific exposure time te and temperature $T(x, y, t)$ |
| $Df = Df(x, y, te, T(x, y, t))$ | Dark current fixed pattern noise at a specific pixel x, y for a specific exposure time te and temperature $T(x, y, t)$ |
| $Ds = Ds(x, y, te, T(x, y, t))$ | Dark current shot noise at a specific pixel x, y for a specific exposure time te and temperature $T(x, y, t)$ |

< > denotes average over many frames.

Some approximations are used to describe embodiments of the invention. For example, $M=Dn+I+Sn+Rn$ expresses a simple model for the measure intensity M, which is composed of the dark current noise Dn, the incoming intensity I, the shot noise Sn and the read noise Rn. In order to simplify the expression the dependencies on pixel location, time and temperature were omitted. $Dn=Df0+Df+Ds$ expresses a simple model for the dark current noise which is composed of a fixed pattern offset Df0, the dark current fixed pattern noise and the dark current shot noise. Again, dependencies of each of these signals on other parameters were omitted. A combination of these two results in $M=Df0+Df+Ds+I+Sn+Rn$.

The ideal situation would be to measure only I, the true intensity. But since all of these signals are summed to a single read (for each pixel), we may not get rid of all of the noises. Nevertheless, some of them can be reduced dramatically and improve the measured signal M toward the true intensity I. For the purposes of this patent application we will not address eliminating the light intensity shot noise Sn and the sensor read noise Rn, but it will be understood that such aspects can also be reduced or eliminated from the observed intensity.

For a frame taken under complete dark conditions the measured intensity is: $MD=Df0+Df+Ds+Rn$ (omitting all sort of dependencies in small brackets as shown before) since the intensity $I=0$ and shot noise $Sn=0$. For averaging many frames taken under complete dark conditions the measured intensity is: $<MD>=<Df0>+<Df+<Ds>+<Rn>>$ denotes averaging over many frames at the same conditions). Since Ds and Rn are random numbers in their nature, i.e. change randomly from frame to frame with normal distribution (or very close to normal), their time average is reduced by a factor of $k^{1/2}$, where k is the number of averaged frames. For example, averaging the darkened frames over 100 frames will reduce Ds and Rn by a factor of 10 (or very close to 10). This will make these two signals (Ds and Rn) almost negligible and will give us: $<MD>=<Df0>+<Df>+(<Ds>+<Rn>)/10\approx<Df0>+<Df>$.

The most simple correction that can be done for the dark current fixed pattern noise is to record in advance the signal $<MD>\approx<Df0>+<Df>$ and subtract it for every frame taken by the camera sensor:
$M(x,y,t,te,T(x,y,t))=Df0(x,y,t,te,T(x,y,t))+Df(x,y,t,te,T(x,y,t))+Ds(x,y,t,te,T(x,y,t))+I(x,y)+Sn(x,y,t,te,T(x,y,t),I(x,y))+Rn(x,y,t)-[<Df0(x,y,f,te,T'(x,y,t'))>+<Df(x,y,f,te,T'(x,y,t'))>]\approx Ds+I+Sn+Rn$. Where t' and T' denote different time and different temperatures with respect to t and T. As explained above, a disadvantage with this correction is that the dark current noise is a function of temperature, and the sensor changes temperature from frame to frame and unevenly between pixel to pixel. A database of averaged dark frames for subtraction can be built for different exposure times, since the exposure time is not know in advance. It is possible to interpolate dark frame between different exposure times to reduce the size of the data base. Interpolation can be done pixel wise.

Embodiments of the invention provide a way to sacrifice some of the pixels over the pixel array to evaluate the fixed pattern noise for any pixel over the sensor array in real time or near real time for each frame based on the dark signal measured at specific darkened pixels. For example, some of the pixels over the pixel array may be covered by an opaque material that blocks light from reaching these pixels. There are many ways to arrange and distribute these darkened pixels, some examples are shown in FIGS. 6-9 and described below. For each distribution of darkened pixels there is a different version of the same concept how to evaluate the dark current fixed pattern noise for those pixels which are not darkened.

Figure 3:
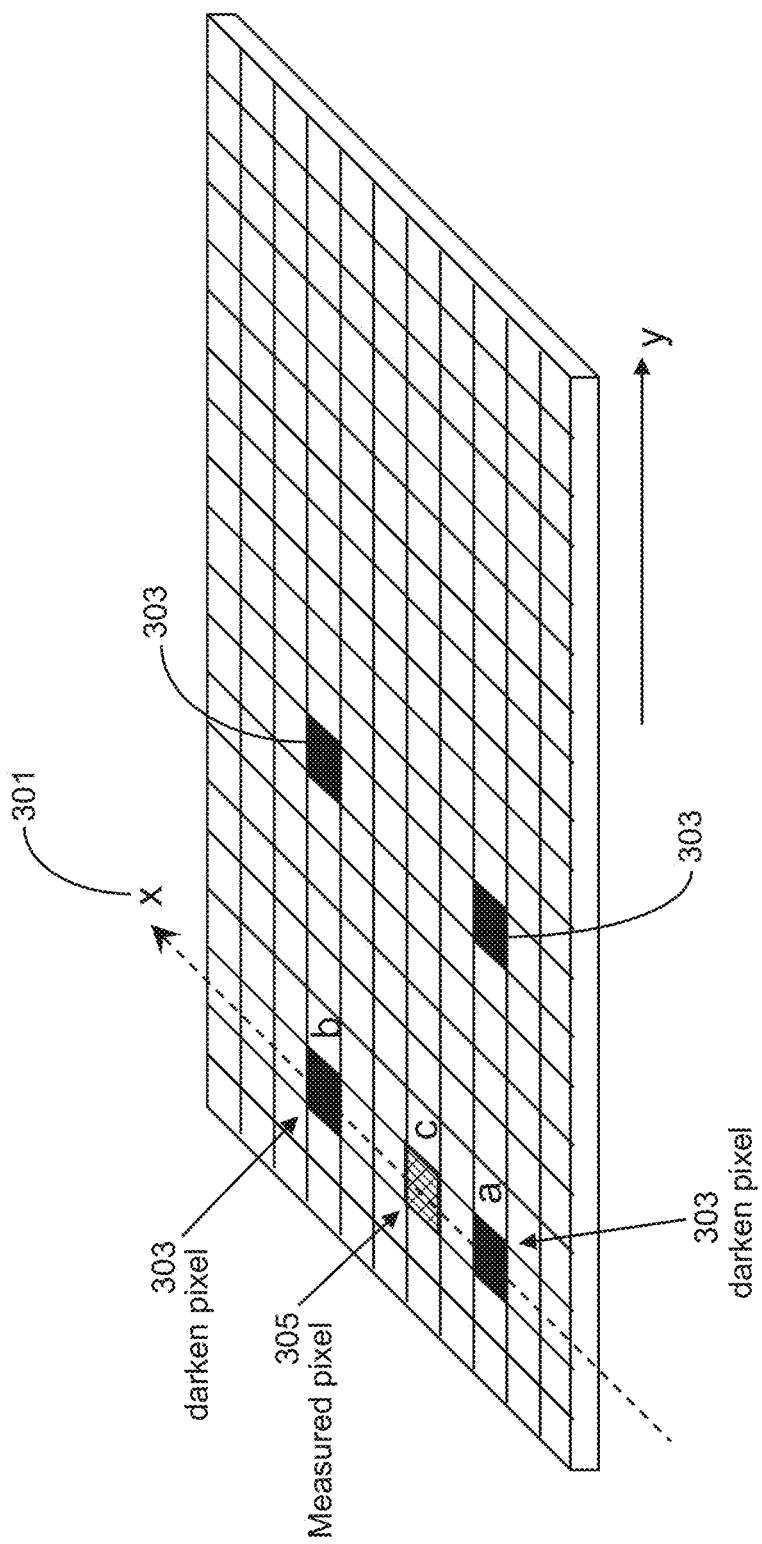
FIG. 3 shows a one dimensional example for correcting dark current noise according to embodiments of the invention.

FIG. 3 shows an exemplary mask configured to darken a plurality of pixels and a one dimensional example for calculation of the correction according to embodiments of the invention. In FIG. 3 each square represents a pixel and a line of pixels along the 'x' axis 301 is marked with dashed line. Darkened pixels 303 are drawn black and un-darkened or uncovered pixels are drawn clear. One specific uncovered pixel (measure pixel 305) is drawn grey for purposes of explanation and denoted as pixel 'c'. The two adjacent darkened pixels along this line of pixels are denoted 'a' and 'b' respectively. The next section explains the relation between the intensities of the darkened pixels 'a' and 'b', and the correction applied to the uncovered pixel 'c'.

We wish to find the dark current fixed pattern correction for the uncovered pixels at a specific frame taken with exposure time te, at time t' with sensor temperature T'. Specifically, we show here how this may be done in one dimension for a specific pixel 'c'.

The following steps should be done under stabilized temperature conditions to give best results. First, a series of many frames may be taken when the sensor array is completely darkened at the shortest exposure time (e.g., 1 millisecond). The term "many" may vary between about 10 frames, and up to more than 1000 frames, depending on the level of the desired quality of the correction. In one embodiment of the invention, 100 frames may be considered reasonable. This series of images may be averaged and given the fixed pattern offset <Df0>. The averaging may eliminate most of the read noise Rn. Second, a series of many frames may be taken when the sensor array is completely darkened at increasing exposure times, one exposure time for each series. For each different exposure time the series of images is averaged and given the exposure-time dependent dark current fixed pattern Dn(x,y,te,t,T). The averaging may eliminate most of the read noise Rn, and dark current shot noise Ds.

Figure 4:
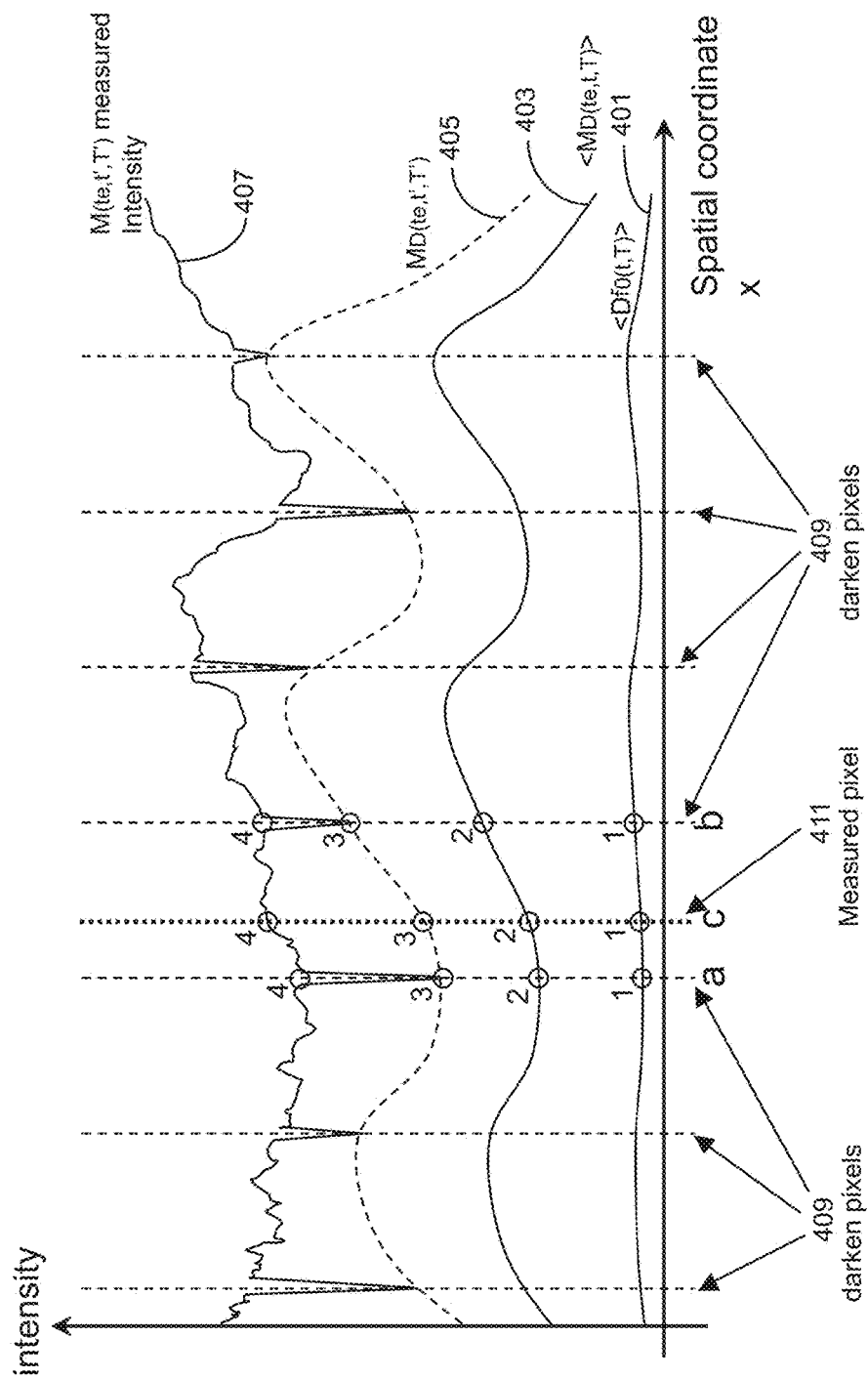
FIG. 4 shows a graph showing measured intensities of various signals according to embodiments of the invention.

FIG. 4 shows a graph showing the measured intensities of various signals. In FIG. 4, t' and T' denote time and temperature at the instance of real signal measurement and t and T denote time and temperature in the past when averaging was performed under dark conditions (e.g., previously recorded dark current fixed pattern). The plot on FIG. 4 shows the intensities of the previously explained signals.

For this one dimensional example the signals are measured along one line of a two dimensional pixel array, shown as 'x' on FIG. 3. Not all the pixels are shown on FIG. 3, but rather only those close to pixels a, b and c which serve for the example. The sensor array can be much larger and the treatment to other pixels may be similar. In FIG. 4, line 401 represents <Df0(t,T)>, which is the time average (along x) of zero exposure time under dark condition as explained above. It was measured and averaged in advance at time t and temperature T. Line 403 represents <MD(te,t,T)>, which is the time average (along x) of the signal measured for exposure time te under dark conditions as explained above. It was measured and averaged in advance at time t and temperature T.

Line 405 represents MD(te,t',T'), which is the theoretical signal that would have been measured (along x) for exposure time te at time t' and temperature T' under dark conditions. It is shown dashed because this signal cannot be measured since the sensor is under real signal illumination at the time t'. Only the darkened pixels 409 sample the dark signal for this curve and they create the negative looking spikes on the upper most curve M. Line 407 represents M(te,t',T'), which is the real measured signal for exposure time te, during time t' and temperature T'. It has negative looking spikes at those pixels (e.g., 409) which are masked and darkened at all times (see FIG. 3). It is this signal that we wish to correct using the information measured previously under complete dark conditions combined with the real-time information measured at the darkened pixels a and b.

Now it will be explained how a single at pixel 'c' is corrected using neighboring darkened pixels 'a' and 'b'. The assumption is that the change in the dark pattern signal at pixel c as a result of temperature variations over the sensor is very close to these changes in pixels a and b.

In a first exemplary example <Df0(t,T)> will not be utilized. If the zero exposure is negligible, it may be skipped. Since everything ideally is done real time or near real time, it may make sense to skip this to save processing power on the device. It is assumed that MD(a,te,t',T'), the signal measured at the darkened pixel a at time t' and temperature T', is related to <MD(a,te,t,T)> by a linear relation G: Ga(a,t',T')=MD(a,te,t',T')/<MD(a,te,t,T)> (using signals a3/a2), and accordingly the same for pixel b: Gb(b,t',T')=MD(b,te,t',T')/<MD(b,te,t,T)> (using signals b3/b2).

Next, Gc is estimated for a regular pixel c that is not darkened: (c−a)/(b−a)=(Gc−Ga)/(Gb−Ga), where a, b and c are locations on the x direction (in units of pixels) and Ga,Gb and Gc are the linear correction factors for this example. Extracting Gc for this expression: Gc=Ga+(c−a)(Gb−Ga)/(b−a).

Next, MD(c,te,t',T') is estimated by using Gc: MD(c,te,t',T')=Gc<MD(c,te,t,T)>.

And finally the corrected intensity at pixel c is calculated by subtracting the real-time estimated dark current fixed pattern noise at pixel c: Cs(c,te,t',T')=M(c,te,t',T')−MD(c,te,t',T') Where Cs(c,te,t',T') is the corrected signal at pixel c with exposure time te at time t' and temperature T'. M(c,te,t',T') is the measured signal at pixel c with exposure time te at time t' and temperature T'. MD(c,te,t',T') is the estimated dark current fixed pattern noise at pixel c for exposure time te at time t' and temperature T'.

In a second exemplary example, the zero exposure time pattern <Df0(t,T)> is taken into account. This adds an offset term (that is not exposure time dependent) when calculating the correction factor G. It is assumed that MD(a,te,t',T'), the signal measured at the darkened pixel a at time t' and temperature T' is related to <MD(a,te,t,T)> by the relation G: Ga(a,f,T')=(MD(a,te,f,T')−<Df0(a,t,T)>)/(<MD(a,te,t,T)>−<Df0(a,t,T)>), (using signals ((a3−a1)/(a2−a1)), and accordingly the same for pixel b: Gb(b,t',T')=(MD(b,te,t',T')−<Df0(b,t,T)>)/(<MD(b,te,t,T)>−<Df0(b,t,T)>), (using signals ((b3−b1)/(b2−b1)).

Next Gc is estimated for a regular pixel c that is not darkened (as in the previous example): (c−a)/(b−a)=(Gc−Ga)/(Gb−Ga), where a,b and c are locations on the x direction (in units of pixels) and Ga,Gb and Gc are the linear correction factors for this example. Extracting Gc for this expression: Gc=Ga+(c−a)(Gb−Ga)/(b−a).

Next MD(c,te,t',T') is estimated by using Gc and using the zero exposure dark current pattern Df0: MD(c,te,f,T')=Gc<MD(c,te,t,T)>+<Df0(b,t,T)>).

And finally we calculate the corrected intensity at pixel c by subtracting the real-time estimated dark current fixed pattern noise at pixel c: Cs(c,te,t',T')=M(c,te,t',T')−MD(c,te,t',T'). Where Cs(c,te,t',T') is the corrected signal at pixel c with exposure time te at time t' and temperature T'. M(c,te,t',T') is the measured signal at pixel c with exposure time te at time t' and temperature T'. MD(c,te,t',T') is the estimated dark current fixed pattern noise at pixel c for exposure time to at time t' and temperature T'.

Figure 5:
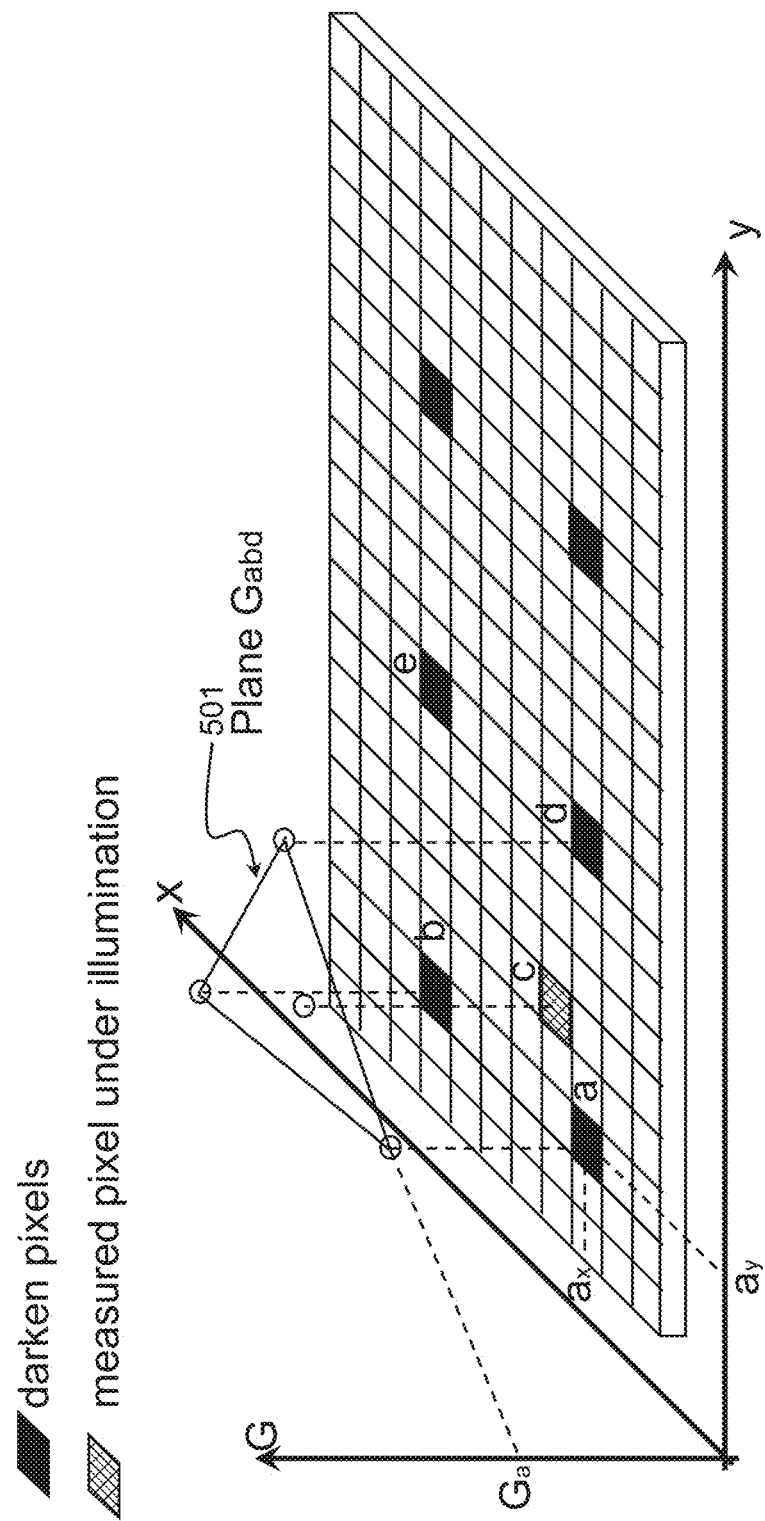
FIG. 5 shows a two dimensional example for correcting dark current noise according to embodiments of the invention.

FIG. 5 shows a two dimensional example for correcting dark current noise according to embodiments of the invention. This example covers a two dimensional case where pixel 'c' does not coincide with the darkened pixels lines. In general, most of the pixels over a two dimensional sensor array may not coincide with the darkened pixels lines (x and y) as shown in the previous examples. The solution for these cases is to evaluate the correction factor Gc using three neighboring darkened pixels. For this example the neighboring darkened pixels will be pixels a, b, and d.

In FIG. 5 each square represents a pixel. Darkened pixels are drawn black and un-darkened or uncovered pixels are drawn clear. One specific uncovered pixel is drawn grey for purposes of explanation and denoted as pixel 'c'. The three nearest darkened pixels are denoted a, b and d.

When pixel 'c' does not coincide with the darkened pixels lines, a plane equation may be calculated for the three neighboring points a, b and d using a general plane equation (this is a linear approximation for a two dimensional case): kx+ly+mG+n=0, where k, l, m, n are constants of the plane, x, y are the pixel array coordinates and G is the correction function. For each of the four points a, b, c and d in FIG. 4, there are three numbers #x, #y, G#, where # denotes the index of the point; a, b, c or d. ax and ay are the coordinates of pixel a, and Ga is the value of the correction factor for that pixel (and so forth for the rest of the pixels, see FIG. 5). The solution for the plane Gabd that is determined by the three darkened pixels a, b, d is given by (solving kx+ly+mG+n=0 for three points):

$$k=(by-ay)(Gd-Ga)-(dy-ay)(Gb-Ga)$$

$$l=(Gb-Ga)(dx-ax)-(Gd-Ga)(bx-ax)$$

$$m=(bx-ax)(dy-ay)-(dx-ax)(by-ay)$$

$$n=-(kax+lay+mGa)$$

The values of G# may be calculated in the same manner as in the previous example. But in this case there are four G# values; three for the darkened pixels Ga,b,d and a forth one Gc for the corrected pixel c. Once the plane Gabd is known by calculating the constants k,l,m,n, it is possible to calculate the value of Gc for a pixel c under illumination by solving the plain equation: Gc=−(kcx+lcy+n)/m. And finally the corrected signal is: Cs(cx,cy,te,f,V)=M(cx,cy,te,t',V)−MD(cx,cy,te,t',V), where M and MD are calculated in the same manner as the two previous examples; with or without taking into account the fixed pattern offset Df0.

There are many ways to distribute the darkened pixels over the sensor array and each one may have its own algorithm and a set of equations to evaluate the correction for the illuminated pixel. Some examples are shown in FIGS. 6-9.

Figure 6:
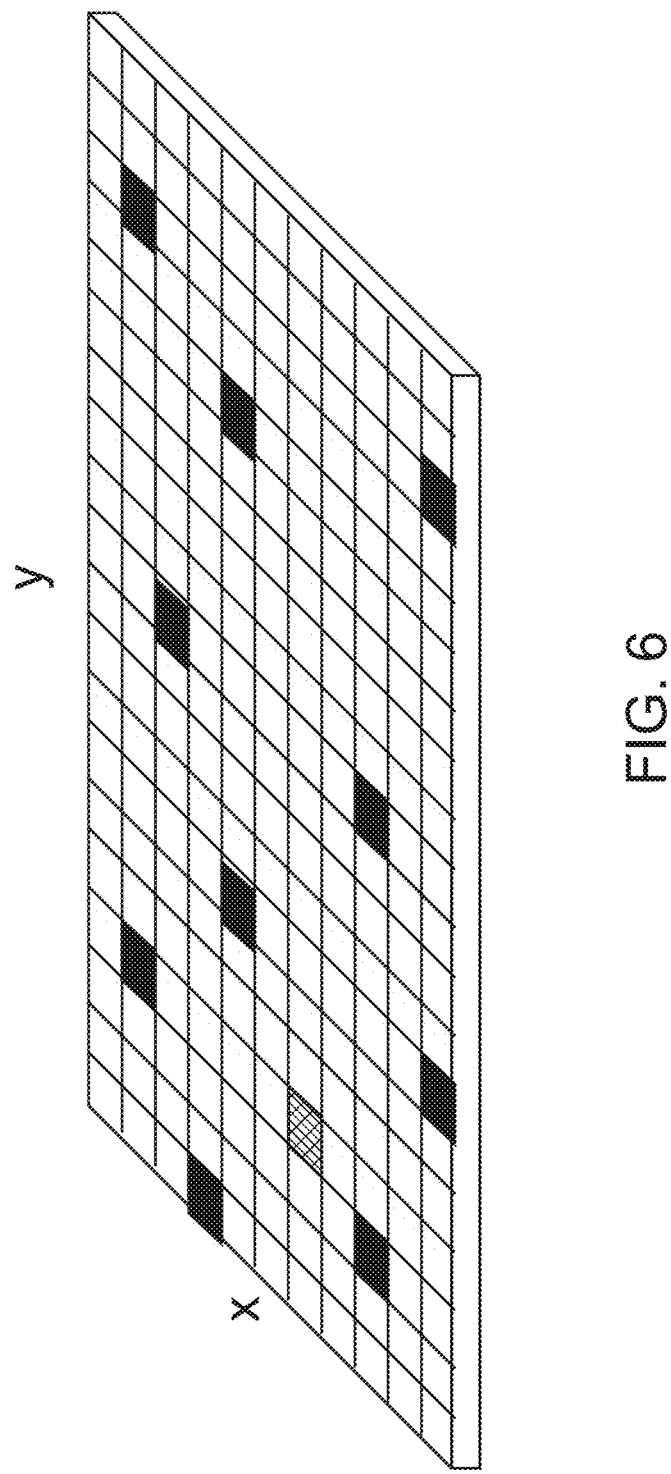
FIGS. 6-9 each show an exemplary mask configured to darken a plurality of pixels according to embodiments of the invention.
Figure 7:
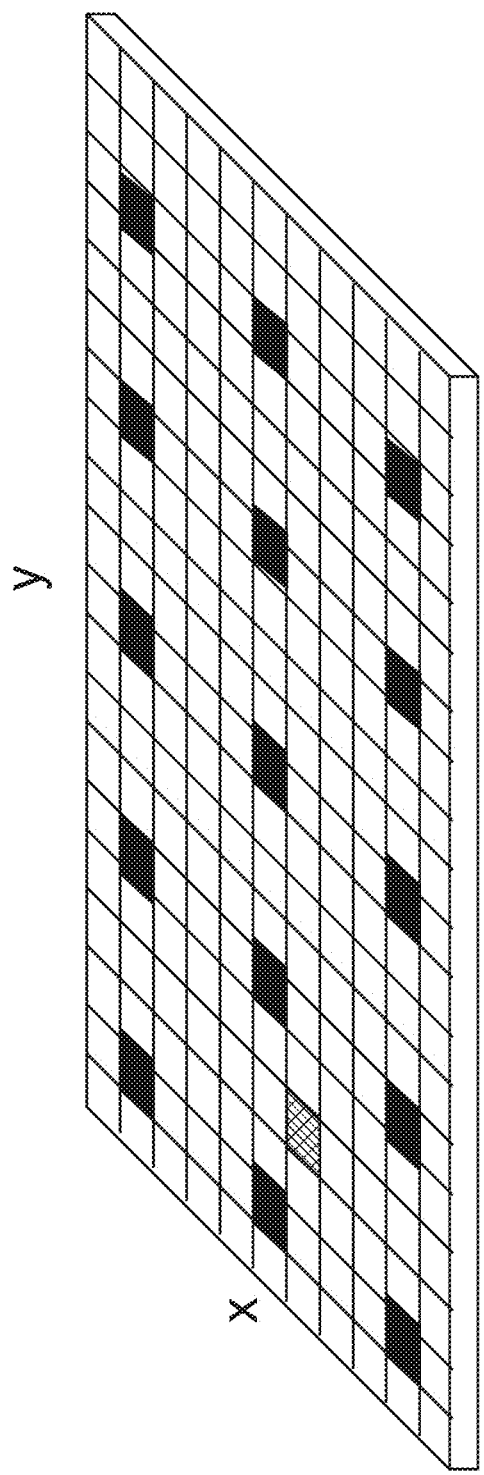

FIG. 6 shows a random or semi-random distribution of the darkened pixels. FIG. 7 shows a two dimensional array of darkened pixels. The density of the darkened pixels can be changed according to requirements and application demands. The denser the darkened pixel array the better the correction, but then more information from the detected object is lost.

Figure 8:
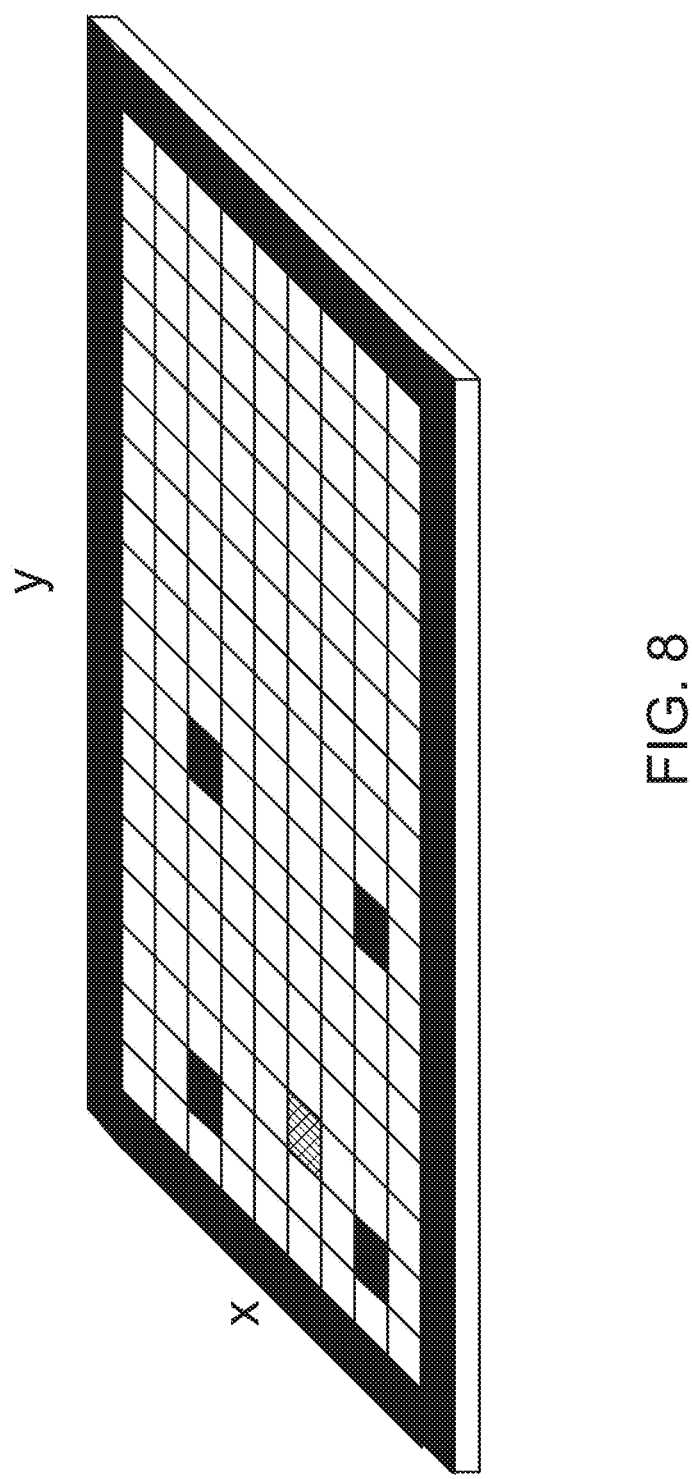

It is also possible to utilize a continuous frame of darkened pixels at the circumference of the array sensor. Utilizing the continuous frame of darkened pixels at the circumference of the array sensor, however, may not be sufficient to compensate for the entire sensor especially if the sensor is a larger size. FIG. 8 shows how it is possible to combine an array of darkened pixels with a continuous frame of darkened pixels at the circumference of the array sensor to better evaluate dark pattern noise variations close to the edge of the sensor, where heat is injected/sinked in a stronger manner.

Figure 9:
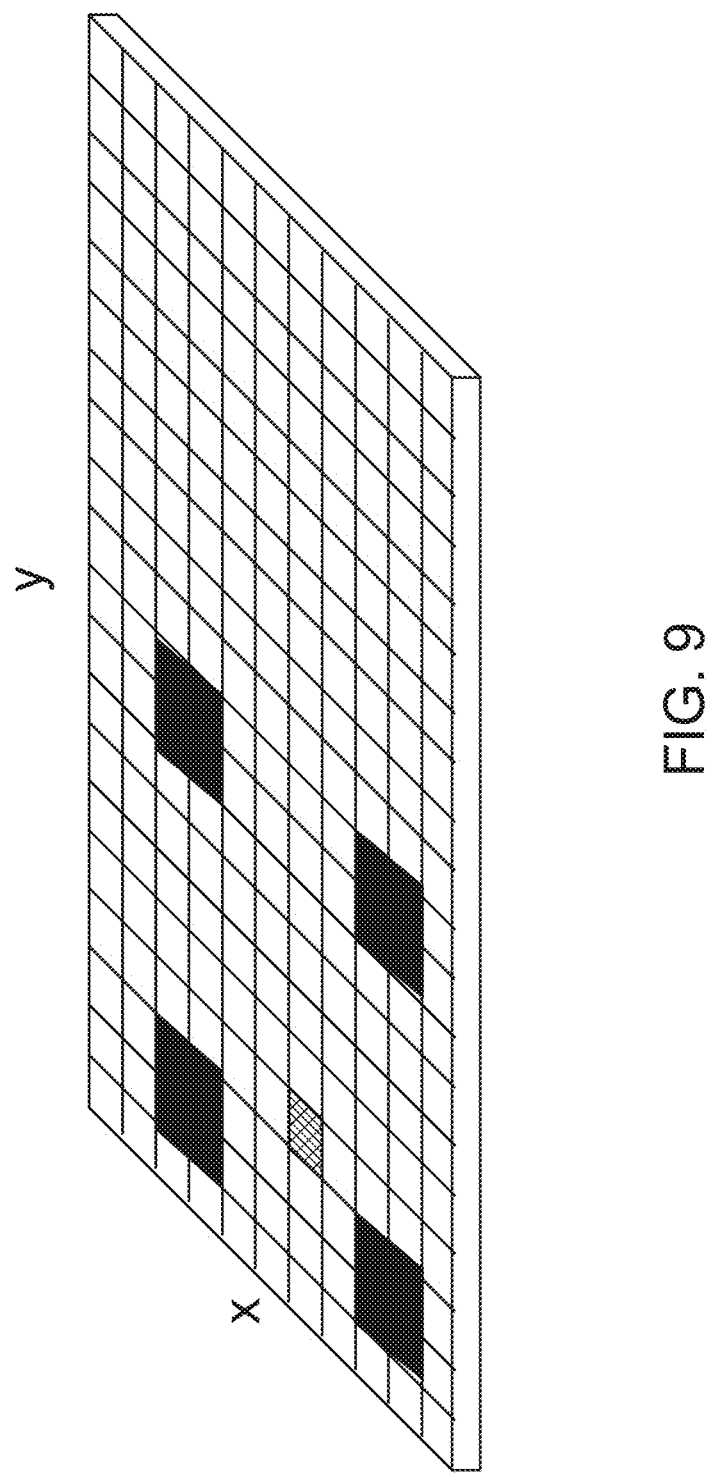

FIG. 9 shows how the darkened pixels can be arranged in groups and not only as single pixels. FIG. 9 shows groups of four pixels in a square shape, but any other symmetric or non-symmetric shape is possible. The pixels within a group can be averaged to improve signal-to-noise ratio (SNR) and represent a single dark region. The darkened pixels can be gathered in groups and averaged in all sort of ways to yield a better representing dark pattern data and less noise. A simple example is shown on FIG. 9, where each darkened area is composed of four adjacent pixels, but other shapes are possible.

There are also many ways to determine which are the closest darkened pixels for each illuminated pixel using known image processing techniques. Moreover, it is possible to take into account more than the closest darkened pixels to the illuminated one. This turns the mathematical process into a fitting one rather than directly solving the equations as was shown in the examples. It is possible to add a weighting function that will give more weight to darkened pixels that are closer to the illuminated one. In this way the closer darkened pixels and their temperature variation will have a greater effect on the correction.

It is possible to replace the missing data points, where there is a darkened pixel, by data points that are interpolated between the neighboring illuminated pixels in order to avoid missing data at the darkened pixels. Interpolation can be using known techniques such as linear, polynomial or many others.

It is possible to improve the prediction of the temperature behavior of the fixed pattern noise, which was assumed to be linear with exposure time here by using the NDR (nondestructive read) mode of a CMOS sensor by tracking over time the behavior of the darkened pixels and using this behavior to predict the behavior of the dark pattern noise in the illuminated pixels.

Embodiments of the invention describe methods of utilizing darkened pixels. It is understood that there are countless ways the darkened pixels may be darkened or made opaque. Embodiments of the invention describe how a mask may be used to darken at least one pixel in the array of pixels, however, methods other than using a mask may be utilized. For example, pixels can be deadened directly on the sensor itself.

In embodiments of the invention, it is possible to evaporate absorbing/reflecting material such as metal (e.g., aluminum, Chromium) directly onto the sensor array through a mask as shown in FIG. 10A. FIG. 10A shows masked areas 101 and pixel array 103.

It is possible to perform the same process, but over a thin sheet of a transparent material and attach it to the sensor array as shown in FIG. 10B. FIG. 10B shows masked areas 105 and pixel array 107. If the sensor array is very large and the pixels are large (e.g., order of 100 microns such as the Teledyne-Dalsa M3), then the mask may be produced in a less costly technique than evaporation, such as high quality printing on transparent materials which may then be attached to the sensor array.

If a faceplate (e.g., a fiber faceplate) is coupled with the sensor array, such as being done with the Teledyne-Dalsa CMOS arrays, then the opaque material can be evaporated/printed over the faceplate itself as shown in FIG. 10C. FIG. 10C shows masked area 109, faceplate 111 and pixel array 113.

The mask may not necessarily need to be very close to the sensor array. In embodiments of the invention the device (e.g., imagining device 1000) may comprise optical components coupled with a sensor. If an imaging system is being used, with optical components such as lenses and mirrors, then the mask can be situated at one of the image planes such as shown in FIG. 10D. FIG. 10D shows an object 115, a first imaging lens 117, where the true image falls on a transparent mask 119, a second imaging lens 121, and masked image 123 and pixel array 125. Accordingly, in embodiments of the invention the optical components may comprise at least one image plane and the mask may be coupled with the at least one image plane.

It is possible in all cases to evaporate/print the mask on any of the transparent substrate, either on the side that faces the sensor array or the side facing away from the sensor array. In the drawings shown in FIGS. 10A-10D they are all shown as facing away from the sensor array, but it could be done on the other side since the masking layer could be thinner than a micron if an opaque enough material is used (such as Chromium).

Embodiments of the invention provide for a number of advantages. For example, embodiments of the invention provide for a more accurate determine of dark current fixed pattern noise and thus, a better quality image when the dark current fixed pattern noise is subtracted from the image data for the image.

Embodiments of the invention may have particular advantages for chemiluminescent measurements. Since chemiluminescent measurements may generate very faint signals, the "true" dark current fixed pattern for a specific time is crucial. Otherwise, if the dark current fixed pattern is wrong (e.g., because of temperature change in the sensor), the dark current fixed pattern noise may be larger than the signal itself, and therefore make subtracting the dark current fixed pattern noise unreliable.

Apart from being able to detect lower signals, another advantage of embodiments of the invention, is that the repeatability increases. The better dark current fixed pattern noise subtraction will reduce the CV (standard deviation) of the higher signals, and therefore improve the reliability of the stronger signals. Embodiments of the invention may also improve repeatability between experiments, since in those cases the dark current change might become even larger because of the time that has passed and the condition that changed in the lab. Thus, variability between experiments may improve as well.

The darkened pixels utilized in embodiments of the invention may also be used as a temperature sensor and then the temperature may be used later to tell something about a chemiluminesent reaction.

Moreover, a more accurate image correction may be made for a long exposure where nondestructive read (NDR) is being used. Individual NDR frames may have their own region-specific correction applied at that moment in time. Electronics heating up during rapid read, or a sample whose temperature is changing due to a chemical reaction or due to it being originally at a different temperature than the sensor or cover plate will be more accurate. A more accurate correction may be made for a long exposure if a sampling of images via NDR is examined for changes the black pixel pattern signal, compensating for dynamic temperature effects as explained above. NDR is described in U.S. Patent Application No. 61/915,930, titled "Non-destructive Read Operations With Dynamically Growing Images," and is hereby incorporated by reference in its entirety into this application for all purposes. Another advantage of using NDR technology is the ability to expand the dynamic range of the sensor because pixels that are close to saturation can be detected and then signal processing can be used to extrapolate a theoretical value after the pixel has saturated. This can be important in dark current subtraction methods because some pixels that have a large amount of dark current can reach saturation quickly. NDR combined with the dark current subtraction discussed here could enable the saturated pixels to be recovered so that the pixel has meaning information about the sample.

Figure 11:
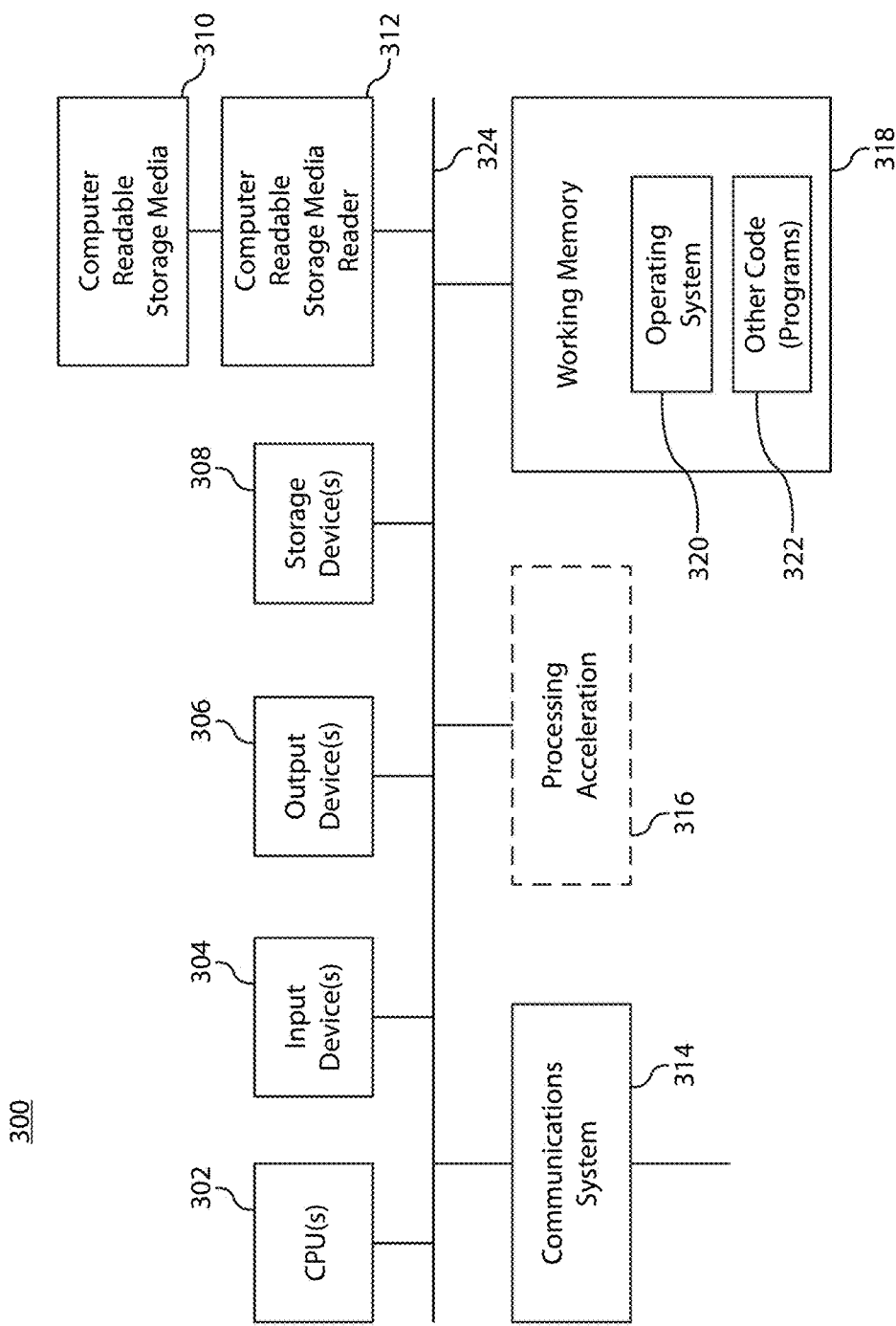
FIG. 11 shows an exemplary computer apparatus that can be used in embodiments of the invention.

Embodiments of the invention may also operate one or more computer systems or apparatuses to facilitate the functions described herein. Any of the elements in embodiments of the invention may use any suitable number of subsystems to facilitate the functions described herein. Examples of such subsystems or components are shown in FIG. 11. FIG. 11 illustrates an exemplary computer system 300, in which various embodiments may be implemented. The system 300 may be used to implement any of the computer systems described above (e.g., device 1000, computer system coupled with device 1000, etc.). The computer system 300 is shown comprising hardware elements that may be electrically coupled via a bus 324. The hardware elements may include one or more central processing units (CPUs) 302, one or more input devices 304 (e.g., a mouse, a keyboard, touchpad, etc.), and one or more output devices 306 (e.g., a display device, a printer, etc.). The computer system 300 may also include one or more storage devices 308. By way of example, the storage device(s) 308 may include devices such as disk drives, optical storage devices, solid-state storage device such as a random access memory ("RAM") and/or a read-only memory ("ROM"), which may be programmable, flash-updateable and/or the like.

The computer system 300 may additionally include a computer-readable storage media reader 312, a communications system 314 (e.g., a modem, a network card (wireless or wired), an infra-red communication device, etc.), and working memory 318, which may include RAM and ROM devices as described above. In some embodiments, the computer system 300 may also include a processing acceleration unit 316, which may include a digital signal processor DSP, a special-purpose processor, and/or the like.

The computer-readable storage media reader 312 may further be connected to a computer-readable storage medium 310, together (and, optionally, in combination with storage device(s) 308) comprehensively representing remote, local, fixed, and/or removable storage devices plus storage media for temporarily and/or more permanently containing, storing, transmitting, and retrieving computer-readable information. The communications system 314 may permit data to be exchanged with the network and/or any other computer described above with respect to the system 300.

The computer system 300 may also comprise software elements, shown as being currently located within a working memory 318, including an operating system 320 and/or other code 322, such as an application program (which may be a client application, Web browser, mid-tier application, RDBMS, etc.). It should be appreciated that alternate embodiments of a computer system 300 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, may include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which may be used to store or transmit the desired information and which may be accessed by the computer. Based on the disclosure and teachings provided herein, a person of ordinary skill in the art may appreciate other ways and/or methods to implement the various embodiments.

It should be understood that the present invention as described above may be implemented in the form of control logic using computer software in a modular or integrated manner. Based on the disclosure and teachings provided herein, a person of ordinary skill in the art may know and appreciate other ways and/or methods to implement the present invention using hardware and a combination of hardware and software Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a (non-transitory) computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention may become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

What is claimed is:

1. A mask coupled with an image sensor wherein the image sensor comprises an array of pixels and a fiber faceplate coupled to the array of pixels, the mask further configured to darken a plurality of isolated pixels or groups of pixels interspersed within the array of pixels, the mask disposed over the fiber faceplate.

2. The mask of claim 1 wherein the mask is configured to darken the plurality of isolated pixels or groups of pixels interspersed within the array of pixels in a random or semi-random distribution.

3. The mask of claim 1 wherein the mask is configured to darken the plurality of isolated pixels or groups of pixels interspersed within the array of pixels in a two dimensional array.

4. The mask of claim 1 wherein the mask is configured to darken a plurality of non-adjacent pixels in the array of pixels.

5. The mask of claim 1 wherein the mask is configured to darken a plurality of a group of more than one adjacent pixel in the array of pixels.

6. The mask of claim 1 wherein the mask comprises a thin sheet of transparent material attached to the fiber faceplate.

7. The mask of claim 1 wherein the mask comprises evaporated absorbing or reflecting material directly onto the fiber faceplate.

* * * * *